Dec. 31, 1963  E. E. NEWHALL  3,116,421
MAGNETIC CONTROL CIRCUITS
Filed Oct. 31, 1961  2 Sheets-Sheet 2

INVENTOR
E. E. NEWHALL
BY
*William H. Kamstra*
ATTORNEY

United States Patent Office 3,116,421
Patented Dec. 31, 1963

3,116,421
MAGNETIC CONTROL CIRCUITS
Edmunde E. Newhall, Brookside, N.J., assignor to Bell Telephone Laboratories, Incorporated, New York, N.Y., a corporation of New York
Filed Oct. 31, 1961, Ser. No. 148,885
18 Claims. (Cl. 307—88)

This invention relates to magnetic control circuits, and particularly to such circuits employing low resistance electrical coupling loops for controlling the magnetic state of one magnetic structure by flux changes in another magnetic structure.

Electrical coupling loops having only a negligible resistance therein for interconnecting magnetic structures are well known. Similarly, the fact that such a low resistance loop may be coupled alone to a magnetic member to inhibit flux changes in the flux path defined by the member has also been recognized in the art. The latter arrangement is employed, for example, in the copending application of A. H. Bobeck, Serial No. 113,814, filed May 31, 1961, to achieve an advantageous selecting switch. In this switch and other circuits using low resistance coupling loops, a particular magnetic core is "shorted" by a current induced in the loop by a flux change in the core itself. When the core is of a material having a high residual magnetism as compared to its saturation magnetism and therefore a well defined "knee" in its hysteresis curve, it may be prevented from switching entirely from one remanent point on the hysteresis curve to the other. Complete flux switching is prevented since the loop contains no resistance or impedance elements and, as a result, a relatively large current is induced in the loop when any flux change begins in the core. As soon as a flux in a shorted core begins an excursion from one remanent point on its hysteresis characteristic curve to the other, the current induced in the low resistance loop in turn creates a magnetic field which opposes the flux reversal. The large current induced in the low resistance loop thus effectively prevents the flux in the core from making more than a negligible excursion which is insufficient to pass beyond the knee of the hysteresis curve. Since the opposing current in the low resistance loop is induced by an incremental flux change in a shorted core, no power supplies are needed to prevent the flux reversal in the coupled core.

The coupling of one magnetic structure to another by means of low resistance coupling loops is also well known in the art. In such prior art interconnections a direct flux linkage is achieved by the low resistance coupling loop with the result that a flux change in one structure to which the loop is coupled causes an equal flux change in the other coupled structure, the direction of the changes being determined by the sense of the coupling in each case. In a coupling loop having only its own inherent resistance therein and therefore subject to only negligible losses, and in which the sense of the coupling is the same for both structures, the algebraic sum of the flux changes thus caused in the two coupled structures is virtually zero. An interconnection of magnetic structures thus described is clearly bidirectional, that is, a flux change in either one of the coupled structures causes a corresponding flux change in the other. As a result, any attempt to employ the coupling loop both as a means to inhibit flux reversal in one of the structures, as discussed in the preceding paragraph, and as a means to link the flux in two structures encounters difficulties. Thus it may be required in particular magnetic switching circuits that the coupling loop serve as a medium for the linkage of flux between two magnetic structures in one direction only while at the same time serving as a low resistance loop for inhibiting flux reversals in one of the structures. Obviously such a selective operation may be achieved in the coupling loop by the introduction therein of diodes or other unidirectional circuit elements. However, such extra elements not only necessarily complicate the circuit and add to its cost, but also introduce sources of power loss.

Accordingly, it is an object of this invention to provide a new and novel interconnection between magnetic switching structures in which unidirectional flux control in one of the structures by flux changes in the other is achieved.

It is another object of this invention to achieve both the inhibition of flux reversals in one magnetic structure and the control of flux states in the latter magnetic structure by flux changes in a second magnetic structure by means of a single low resistance coupling loop.

Still another object of this invention is the application of a magnetic structure having a plurality of balanced flux legs therein to achieve unilateral flux control with another magnetic structure.

Another object of this invention is to provide a new and novel magnetic translation circuit.

The foregoing and other objects of this invention are realized by the novel application of the balanced leg principle in multileg magnetic structures. Such a structure is described, for example, in the copending application of R. M. Averill, Jr., Serial No. 79,686, filed December 30, 1960, now U.S. Patent No. 3,048,826, issued Aug. 7, 1962 and is formed to present a plurality of parallelly arranged flux switching legs. The flux switching legs, which are of a magnetic material having substantially rectangular hysteresis characteristics, are integrally connected at each end by a pair of cross rails. A drive leg is also integrally connected with the connecting side rails in a manner such that each of the closed flux loops defined through the common drive leg and the plurality of flux switching legs is of the same magnetic reluctance. This equal reluctance is most easily provided for in the normal case by dimensioning all of the legs to be equally flux limited, specifically, by dimensioning the legs to have the same minimum cross-sectional areas. When a drive flux is induced in the drive leg a magnetomotive force is, as a result, applied to each of the flux switching legs parallelly connected thereto. Importantly, because of the equal reluctance presented by the flux switching legs, this drive magnetomotive force is applied equally to each of the latter legs. Since the common drive leg is flux limited to the same extent as each of the parallel flux switching legs, it can supply only sufficient flux to saturate fully only one of the latter legs.

The equal reluctance flux switching legs may be said to be balanced with respect to the available paths presented therethrough to the drive flux. Obviously, in order for the drive flux to close through any selected one of the flux switching legs, it is necessary only to provide a counter magnetomotive force to each of the nonselected legs. Although such a counter magnetomotive force is opposite in direction to the applied drive flux, it need not, however, be of a magnitude sufficient to cancel completely the drive flux with respect to each flux switching leg. Since the latter legs have substantially rectangular hysteresis curves, it is only necessary that the counter magnetomotive force applied to each of the nonselected flux switching legs be sufficient to prevent a flux excursion beyond the knee of the hysteresis curve. Only a relatively small counter magnetomotive force applied to each nonselected flux switching leg may be said to be sufficient to "tip the scale" in favor of a selected flux switching leg for the applied drive flux.

A simplified illustrative embodiment of this invention comprises, in addition to the magnetic structure described in the foregoing, a control magnetic structure which, for purposes of description, may conveniently comprise a conventional toroidal magnetic core also having substantially rectangular hysteresis characteristics. The two structures are electrically coupled together by a coupling loop having only its own inherent resistance therein. Specifically, the coupling loop is inductively coupled to the torodial core and the flux switching legs of the balanced structure by single turn windings. If the resistance of the coupling loop is maintained so low as to be negligible then the total amount of flux linked by the coupling loop in the two structures will be equal. Any flux change in the control core is thus accompanied by an equal total flux change in the coupled balanced structure, the direction of the flux changes being determined by the sense of the windings of the coupling loop. To insure that the control core is able to deliver sufficient flux to the balanced structure so that the required flux control may be achieved in the flux switching legs, the flux limitation of the control core is held to the sum of the flux limitations of the flux switching legs in which the flux is to be controlled.

The circuit arrangement thus described is adapted as a simple two output selection switch by providing two balanced flux switching legs in the magnetic structure to be controlled. Control of flux changes in the latter legs is achieved by providing a small gating aperture in each of these legs, which aperture divides each leg into a first and a second branch leg. The low resistance coupling loop is wound on the corresponding branch legs of the flux switching legs in opposite senses. The selection switch is set during an input phase by switching the control core from a reset to a set magnetic state by means of a setting current pulse applied to an input winding also coupled to the core. The switching of the core induces a current in the low resistance coupling loop, which current in turn drives the corresponding coupled branch legs of the two flux switching legs to opposite directions of magnetic saturation. As a result, the flux in one of the latter legs will be oriented in a clockwise direction around its gating aperture and the flux in the other of the flux switching legs will be oriented in a counterclockwise direction around its gating aperture. The low resistance coupling loop will thus link flux in one direction in the coupled branch leg of one of the flux switching legs and in the opposite direction in the coupled branch leg of the other such leg.

In an output phase of operation, a drive flux is induced in the common drive leg which effectively applies an equal magnetomotive force to each of the flux switching legs as previously explained. It will be apparent from the flux orientations described in the foregoing that, with a drive flux of either polarity, one of the flux switching legs will have the branch leg to which the loop is coupled magnetized in the direction opposite to that of the drive flux and will have the other branch leg magnetized in the same direction as that of the drive flux. Conversely, the other flux switching leg will have the branch leg to which the loop is coupled in the same direction as that of the drive flux and will have the other branch leg magnetized in the opposite direction. From these flux states, it is clear that the drive flux, in order to close through a flux switching leg, must necessarily pass through the branch leg in which a flux switching can occur since the other branch leg is already saturated. Two such branch legs in which a flux switching can occur are presented in the two flux switching legs: one having the coupling loop coupled thereto and the other not so coupled.

It is a feature of this invention that a selection between the two foregoing switchable branch legs is made by the low resistance coupling loop which was also initially employed to introduce the particular flux orientations described. In order to achieve this selection by the drive flux, a counter, inhibiting magnetomotive force is applied to the nonselected branch leg, which counter force is of a magnitude just sufficient to insure that the nonselected leg does not attain a flux excursion beyond its switching threshold as previously described. This relatively small current is obtained by means of the low resistance coupling loop which prevents the drive flux from closing through the switchable branch leg of one of the flux switching legs to which it is coupled, also as previously explained. The drive flux is unable to close through the other branch leg of the same flux switching leg since, it will be recalled, this leg is already magnetically saturated. The switchable branch leg of the other flux switching leg however, is not coupled to the low resistance loop, which loop is coupled to the branch leg of this flux switching leg which is saturated in the direction of the drive flux. As a result, the drive flux closes through the latter switchable branch leg where no opposing magnetomotive force is encountered.

Advantageously according to this invention, the small inhibiting current generated to achieve selection between the branch legs is of insufficient magnitude to disturb the magnetic state of the coupled control core. In this manner, the interconnection of the two magnetic structures is effectively unilateral. Although complete control over the flux orientations in the flux switching legs of the balanced structure is had by the control core, the inhibiting operation of the coupling loop is unable to cause, in a backward direction, more than a negligible flux excursion in the control core. A practicable interconnection is thus achieved in which the dimensions of the control core or other control magnetic structure may be held to a minimum.

The selection circuit of the simplied embodiment being described completes its operation during the output stage by means of output windings coupled to the two flux switching legs. When the drive flux is closed through the selected branch leg of one of the latter legs, an output signal is induced in the coupled output winding, which signal is indicative of the fact that the control core was previously set. In a final reset phase, both the flux legs of the balanced magnetic structure and also the control core are reset to their normal flux states by suitable windings also coupled thereto.

The feature of this invention that a low resistance electrical coupling loop interconnecting two magnetic structures is employed both for controlling flux changes in one structure by flux changes in the other and the control of flux changes in one structure alone, thus offers a highly advantageous solution to the problem of backward transfer previously encountered when such interconnection has been attempted. Although one of the magnetic structures includes a plurality of balanced flux switching legs when more than a simple logic operation is to be accomplished, this balanced structure may be employed to accomplish virtually any logic operation performable by other multileg or apertured magnetic structures.

The foregoing and other objects and features of this invention will be better understood from a consideration of the detailed description of specific, illustrative embodiments thereof which follows when taken in conjunction with the accompanying drawing in which.

Figure 1:
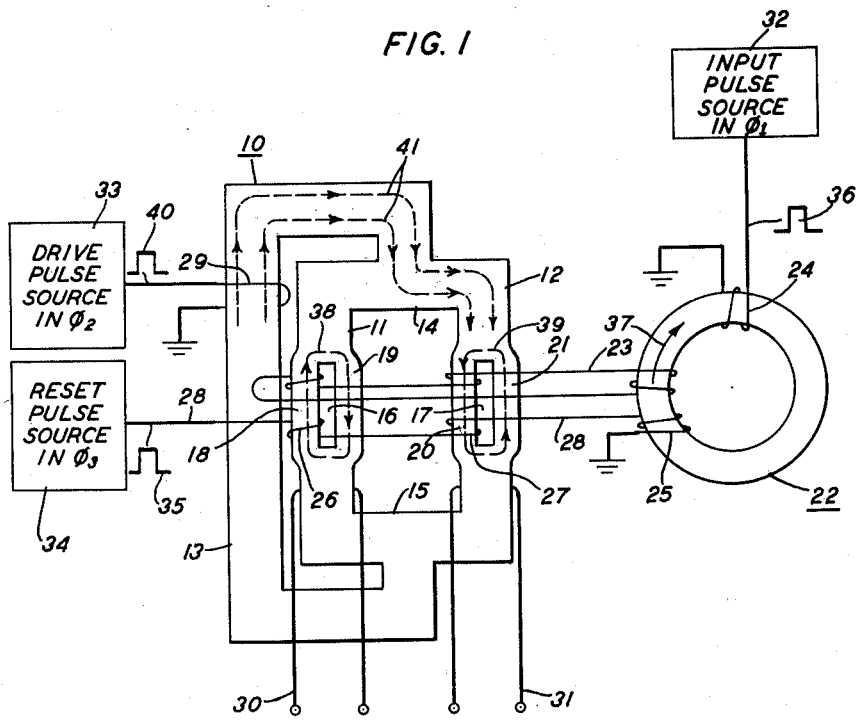
FIG. 1 shows a simple logic circuit illustrating the principles of this invention.

Turning now to the drawing, the details of a simplified selection circuit embodying the principles of this invention will be described. FIG. 1 shows such a circuit and comprises a magnetic structure 10 of a material having substantially rectangular hysteresis characteristics. The structure 10 is formed to present a plurality of legs, which legs are equally flux limited in order to achieve the required control of flux induced therein during the operation of the circuit. Specifically, a pair of flux switching legs 11 and 12 are integrally connected at each end to a common drive leg 13 by means of cross rails 14 and 15. Each of the flux switching legs 11 and 12 has a slotted aperture 16 and 17 therein which divides the latter legs into two alternate branch legs 18 and 19, and 20 and 21, respectively. These alternate branch legs, as will be evident hereinafter, are used to achieve a gating of the flux attempting to find closure therethrough. The flux limitations of the various legs so far described are determined such that the minimum cross-sectional areas of the legs 11, 12, and 13 are each substantially equal to at least twice the minimum cross-sectional area of any of the branch legs 18 through 21. Assuming homogeneity in the magnetic material throughout the structure 10, each of flux switching legs 11 and 12 will present the same reluctance to a magnetic flux.

A second magnetic structure also having substantially rectangular hysteresis characteristics, which in this embodiment may conveniently comprise a conventional toroidal magnetic core 22, is associated with the structure 10 by means of an electrical coupling loop 23. The coupling loop 23 has no electrical elements therein and is characterized only by its own inherent resistance, which for purposes of describing the principles of this invention, may be assumed to be negligible. The loop 23 is inductively coupled to the core 22 and to corresponding branch legs 18 and 20 of the flux switching legs 11 and 12, respectively, by single turn windings. The windings on the latter branch legs are in opposite senses. The core 22 is also flux limited with relation to the legs of the structure 10, its minimum cross-sectional area being maintained substantially equal to the sum of the minimum cross-sectional areas of the coupled branch legs 18 and 20. The core 22 also has an input winding 24 coupled thereto as well as a reset winding 25. The senses of the latter winding will be considered with respect to an illustrative operation of the selection circuit to be described.

Also coupled to the branch legs 18 and 20 are reset windings 26 and 27 which reset windings are serially connected with the reset winding 25 in a reset circuit 28. The senses of the latter windings 26 and 27 will also be hereinafter considered. Inductively coupled to the drive leg 13 is a drive winding 29 and the flux switching legs 11 and 12 also have output windings 30 and 31, respectively, coupled thereto. In order to supply the necessary energizing currents to the circuit, the input winding 24 is connected between ground and an input pulse source 32, the drive winding 29 is connected between ground and a drive pulse source 33, and the reset circuit 28 is connected between ground and a reset pulse source 34. Each of the pulse sources 32, 33, and 34 may comprise current pulse generators of a character well known in the art capable of providing current pulses of a magnitude and polarity to be particularly described hereinafter.

Illustrative cycles of operation of the selection circuit of FIG. 1, will be described starting with the last or reset, phase of an assumed previous cycle of operation. In the reset phase, a positive current pulse 35 is applied to the reset circuit 28 by the reset pulse source 34. This pulse 35 is of sufficient magnitude to generate a magnetomotive force sufficient to saturate each of the branch legs 18 and 20 and the sense of the reset windings 26 and 27 is such that this saturation is in a downward direction in the leg 18 and an upward direction for the leg 20, both directions being as viewed in the drawing. Since the magnetic flux so induced in the branch legs 18 and 20 closes through the paths of least reluctance, flux will be induced in the flux switching leg 11 in a counterclockwise direction around the aperture 16 and in clockwise direction in the leg 12 around the aperture 17. The pulse 35 is also of sufficient magnitude to generate a magnetomotive force sufficient to switch the core 22 to a reset remanent state and the sense of the reset winding 25 is such that this state is counterclockwise as viewed in the drawing. With the flux in the structures 10 and 22 thus oriented, the circuit of FIG. 1 is prepared for a complete cycle of operation.

The circuit is adapted to supply an output signal on one or the other of the output windings 30 or 31, respectively, as determined by whether or not the input pulse source 32 applied a current pulse 36 to the input winding 24 of the core 22. For the first illustrative cycle of operation it will be assumed that a positive current pulse 36 was in fact applied, during an input phase $\Phi_1$ of the cycle, to the input winding 24 by the pulse source 32. This pulse 36 is of a magnitude and the sense of the input winding 24 is such that the core 22 has its magnetic state switched to a clockwise, or set, direction as represented by the arrow 37. The flux reversal in the core 22 induces a current in the coupling loop 23, which current, because of the negligible resistance of the loop 23, is sufficient to cause a corresponding flux reversal in the coupled branch legs 18 and 20 of the flux switching legs 11 and 12, respectively. Since the resistance of the coupling loop 23 is arbitrarily low, the flux linked thereby in the two structures 10 and 22 is substantially equal. Also, because the total flux limitations of the two structures 10 and 22 are also equal, each of the flux paths linked by the coupling loop 23 will be remanently saturated. The flux switched in the branch legs 18 and 20 will be closed through the paths of least reluctance as presented by the other branch legs 19 and 21, respectively. The resulting flux orientation in the flux switching legs 11 and 12 may thus be represented around the apertures 16 and 17 by the dashed lines and arrows 38 and 39, respectively.

In the drive phase $\Phi_2$, a positive drive pulse 40 is applied by the drive pulse source 33 to the drive winding 29. The pulse 40 is of a magnitude and the winding 29 is in the sense such that a drive flux is induced in the drive leg 13 in a clockwise direction as viewed in the drawing. The drive flux is represented by the dashed lines 41 which are shown double to maintain consistency with the representation of the flux in the branch legs 18 through 21 in view of the relative flux limitations of these legs. As was mentioned previously, the magnetomotive force generated by the drive pulse 40 inducing the drive flux in the leg 13 is applied equally across the flux switching legs 11 and 12 because of the equal reluctance of these legs. Because the legs 11 and 12 are so balanced the drive flux can ordinarily divide equally between them and such a flux change is in fact initiated in the legs 11 and 12 upon the application of the drive pulse 40. However, in view of the direction of the flux orientations in the branch legs 18 through 21, an inspection of FIG. 1 makes clear that, in each case, one of the branch legs is already saturated in the direction of the applied drive flux while the other branch leg is saturated in the direction opposite to that of the drive flux. The branch legs having the latterly directed flux therein accordingly present the only available paths for closure of the drive flux. However, one of the latter branch legs, leg 18, has the low resistance coupling loop 23 wound thereon. As a result, as the flux in the leg 18 begins an excursion in the direction of opposite saturation, a current is induced in the coupling loop 23 which in turn generates a magnetomotive force which opposes the magnetomotive force generated by the drive pulse 40.

Since the switchable branch leg 21 of the other flux switching leg 12 is not coupled to the loop 23, no such countermagnetomotive force opposes the drive flux at this path. Since the paths presented to the drive flux are of equal reluctance, only a relatively small opposing current in the coupling loop 23 is sufficient to "tip the scale" in favor of the flux switching leg 12, and this small current is advantageously generated by the initial beginning flux excursion in the branch leg 18. Although a small flux excursion in fact is caused in the latter branch leg, the leg is not driven beyond its threshold of switching, or knee, of its hysteresis curve. Accordingly, the drive flux effectively finds closure through the flux switching leg 12, this direction being represented in the drawing by the dashed lines 41. Continuity in the symbolism chosen to represent the flux reorientations in the structure 10 is maintained by linking the flux in the branch leg 20 with one of the quantities of drive flux and linking the other of the quantities with the flux switched in the branch leg 21. The flux orientation around the aperture 16 in the flux switching leg 11 remains effectively undisturbed except for the momentary initial flux excursion which generated the selecting countermagnetomotive force. The drive flux, after causing the described flux changes in the flux leg 12, completes its closure through the cross rail 15 and lower portion of the drive leg 13, which closure is not represented in the drawing. During the drive phase $\Phi_2$, the reset circuit 28 and its windings 26 and 27 are assumed to be electrically uncoupled from the structure 10 so that these windings produce no inductive effect on the flux control in the legs 11 and 12.

As a result of the flux changes described in the foregoing, and particularly in the flux leg 12, an output signal is induced alone in the output winding 31. This signal is indicative of the fact that an input pulse 36 was applied to the input winding 24 during the input phase $\Phi_1$. Had no such input pulse 36 been so applied during the input phase, the flux orientations about the apertures 16 and 17 in the flux switching legs 11 and 12, respectively, would have remained as described following the previous reset phase, that is, opposite in direction to that shown by the dashed lines and arrows 38 and 39. A countermagnetomotive force would, in the latter case, have been generated in the coupling loop 23 by the attempted switching of the branch leg 20 to which the loop 23 is coupled. The drive flux would then have found closure through the branch leg 19 which afforded a switchable path thereto and which was uncoupled to the loop 23. An output signal would then be generated alone in the output winding 30, which output signal would be indicative of the fact that no input pulse 36 was applied to the input winding 24 during the input phase $\Phi_1$.

In either of the two cases above described, it is important to note that the relatively small inhibiting current generated in the coupling loop 23 is of insufficient magnitude to disturb the information bearing magnetic state of the control core 22. This then is accomplished without the use of diodes or other electrical elements in the coupling loop 23 or the introduction of external power sources to provide this inhibiting function. The balanced nature of the structure 10 thus makes possible a practicable unilateral interconnection with the core 22 or other similar magnetic control structure without extending the dimensions of the core 22 to unmanageable proportions.

As already described, during a subsequent reset phase $\Phi_3$, a reset pulse 35 applied from the pulse source 34 to the reset circuit 28 restores both the magnetic structures 10 and 22 to their normal magnetic states. Specifically, the flux in the branch legs 18 through 21 will be reversed in the direction from that shown by the dashed lines and arrows 38 and 39 and the core 22 will be restored to the reset state. As the result of the reset flux reorientation in the flux switching legs 11 and 12 the drive leg 13 will be restored to an effectively neutral magnetic state.

Figure 2:
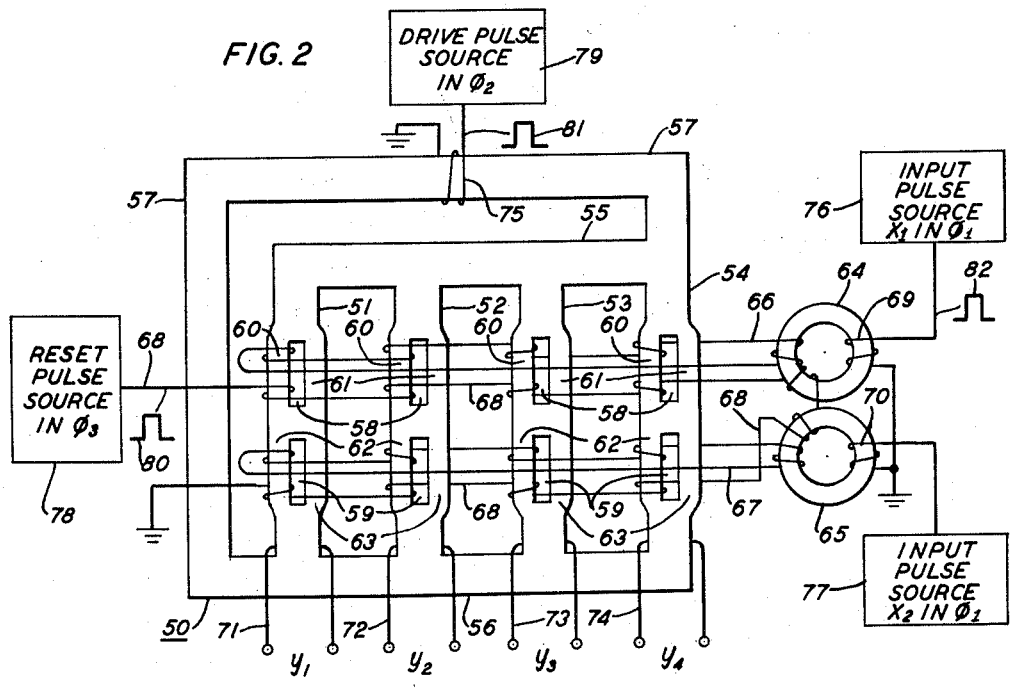
FIG. 2 shows a binary to one-out-of-four translation circuit embodying the principles of this invention.

In FIG. 2 is depicted a binary to one-out-of-four translation circuit also embodying the principles of this invention. The circuit comprises a magnetic structure 50 of a magnetic material having substantially rectangular hysteresis characteristics which is formed to present a plurality of flux switching legs 51 through 54. The latter legs are parallelly arranged and integrally connected between a pair of cross rails 55 and 56. At diagonally opposite corners of the rectangle so formed is connected a common drive leg 57. Each of the legs 51 through 54 has a pair of slotted apertures 58 and 59 therein serving the same leg dividing function as described in connection with the embodiment of FIG. 1. The apertures 58 and 59 divide each of the flux switching legs 51 through 54 into two pairs of branch legs 60, 61, and 62, 63, respectively. The various legs of the structure 50 are also flux limited with respect to each other; as in the embodiment of FIG. 1, the drive leg 57, the undivided portions of the flux switching legs 51 through 54, and the cross rails 55 and 56 are so dimensioned that the minimum cross-sectional area of each is at least equal to substantially twice the minimum cross-sectional area of any one of the branch legs 60 through 63. The legs 51 through 54 of the structure 50 are also balanced; it may be noted from the drawing that the closed flux paths through the common drive leg 57 and the flux switching legs 51 through 54 are of the same length. Thus since each flux leg is flux limited to the same degree, and again assuming homogeneity in the magnetic material, each flux leg will present the same reluctance to a magnetomotive force applied to the drive leg 57.

A pair of conventional toroidal magnetic cores 64 and 65 is associated with the structure 50 by means of low resistance coupling loops 66 and 67, respectively. The cores 64 and 65 are each also of a material exhibiting substantially rectangular hysteresis characteristics and are dimensioned so that each has a minimum cross-sectional area at least equal to substantially the sum of the minimum cross-sectional areas of any set of corresponding branch legs of the flux switching legs 51 through 54. Thus, for example, the sum of the minimum cross-sectional areas of the set of branch legs 60 of the legs 51 through 54 is equal to substantially the minimum cross-sectional area of either one of the cores 64 or 65. The low resistance coupling loop 66 coupling the core 64 to the balanced magnetic structure 50 is wound by single turn windings in this embodiment to the branch legs 60 of each of the flux switching legs 51 through 54. However, for reasons which will become apparent hereinafter, the windings of the loop 66 on the branch legs 60 of the flux switching legs 51 and 52 are in senses opposite to those of the windings on the branch legs 60 of the flux switching legs 53 and 54. The low resistance coupling loop 67 coupling the core 65 to the structure 50 is wound by single turn windings to the branch legs 62 of each of the flux switching legs 51 through 54. The windings of the loop 67 with respect to the coupled branch legs 62 of the flux switching legs 51 and 53 are in senses opposite to those of the windings on the branch legs 62 of the flux switching legs 52 and 54. A reset circuit 68 serially connects reset windings on each of the branch legs 60 and 62 and on the cores 64 and 65. Additional windings on the cores include the input windings 69 and 70 on the cores 64 and 65, respectively. The structure 50 also has a plurality of output windings 71 through 74 coupled to the flux switching legs 51 through 54, respectively, and a drive winding 75 is coupled to the drive leg 57.

The input windings 69 and 70 are connected between ground and a pair of binary input pulse sources 76 and 77, respectively. The sources 76 and 77 may comprise any circuitry well known in the art capable of providing single rail binary input current pulses of a magnitude and polarity to be more particularly described hereinafter. The reset circuit 68 is also connected at one end to ground and is connected at its other end to a reset pulse source 78. The drive windings 75 is connected between ground and a drive pulse source 79. The sources 78 and 79 may also comprise suitable current pulse sources capable of the providing current pulses of a magnitude and polarity to be described. Since none of the pulse sources generally referred to with respect to the embodiments of this invention comprise inventive subject matter and since these are readily envisioned by one skilled in the art, they are shown in block symbol form only.

With respect to the control of flux reorientations in the structure 50, the basic operation of the embodiment of FIG. 2 is similar to the illustrative operation described in connection with the embodiment of FIG. 1. Again assuming the completion of a reset phase $\Phi_3$ of a previous cycle of operation in which a positive reset current pulse 80 was applied to the reset circuit 68 from the source 78, the branch legs 60 through 63 of the flux switching legs 51 through 54 will have the flux directed therein as represented by the directional arrows shown in FIG. 3A. These directions may be verified from an examination of the sense of the reset windings on the branch legs. In the first illustrative operation to be considered it will be assumed that both of the binary bits of the information to be translated are "0's." Accordingly, no input pulses are applied to the input windings 69 and 70 of the cores 64 and 65, respectively, from the input pulse sources 76 and 77. The control cores 64 and 65 as a result remain in the reset magnetic state to which they were driven by the assumed reset phase of the previous cycle of operation. As a further result, no flux switching is caused in any of the sets of branch legs 60 through 63 of the legs 51 through 54. The flux in these branch legs thus remains in the reset states as symbolized in FIG. 3A. An inspection of FIG. 2 with reference to the table of flux states of FIG. 3A makes clear that, if a drive flux should be introduced in the drive leg 57 in a clockwise direction as viewed in the drawing, each of the flux switching legs 51 through 54 offers two branch legs in which a flux switching and hence a closure of the drive flux can ordinarily occur. However, three of the flux legs, legs 51 through 53, have the switchable branch legs coupled to one or the other of the low resistance coupling loops 66 and 67. These couplings are symbolized in FIG. 3A by windings on the arrows representing the switchable flux in the particular branch legs under consideration. As explained with reference to the embodiment of FIG. 1, the branch legs which are magnetized in the direction of the drive flux are already saturated and thus are effectively blocked thereto.

In the next following drive phase $\Phi_2$ a positive drive current pulse 81 is applied to the drive winding 75 coupled to the drive leg 57 from the drive pulse source 79. A magnetomotive force is generated thereby which induces a magnetic flux in the drive leg 57 in a clockwise direction as viewed in the drawing. Since the flux legs 51 through 54 are balanced, the magnetomotive force is applied equally across these legs and initially the induced drive flux begins to close equally through each of the flux legs 51 through 54. However, in those branch legs carrying a flux opposite in polarity to the induced drive flux, a flux switching and therefore closure of the drive flux can occur only if no opposing magnetomotive force is encountered. In three of the flux switching legs, legs 51, 52, and 53, at least one of the switchable branch legs is coupled to one or the other of the low resistance coupling loops 66 and 67 as previously mentioned. As a result, the opposing current induced in the latter loops by the beginning flux switching prevents the excursion of flux in these branch legs beyond their switching thresholds. However, neither of the switchable branch legs of the flux switching leg 54 are coupled to either one of the loops 66 or 67. Accordingly, the drive flux closes through the branch legs 61 and 63 of the latter flux switching leg. As in the embodiment of FIG. 1, the inhibiting current generated in the nonselected legs 51 through 53 is relatively small and therefore is insufficient to cause more than a negligible flux excursion in the coupled control cores 64 and 65. The scale has thus been tipped in favor of the selected flux leg 54 by substantially less current than would be necessary to hold each of the entire legs 51 through 53 in a particular remanent state, and importantly, no backward transfer has resulted in the coupling loops 66 and 67.

During the drive phase $\Phi_2$, when the flux changes as described in the foregoing occur in the flux leg 54, an output signal $y_4$ is generated in the output winding 74.

The signal $y_4$ is thus indicative of the fact that the input variables introduced into the translation circuit of FIG. 2 were $x_1=0$, $x_2=0$.

One more illustrative input phase of operation will suffice to understand each of the operations possible with the circuit of FIG. 2. For this illustrative case, it will be assumed that the input variables are $x_1=1$, $x_2=0$. During the input phase $\Phi_2$, the input pulse source 76 is energized to apply a positive current pulse 81 to the input winding 69 of the control core 64. As a result, the latter core is switched to a set magnetic state from its normally reset state. The switching of the control core 64 induces a current in the coupling loop 66 which in turn reverses the flux states of each of the branch legs 60 and 61 of the flux legs 51 through 54. The new flux states are symbolized by directional arrows in FIG. 3B. Obviously since the control core 65 remains undisturbed since its variable $x_2=0$, the reset flux states of the branch legs 62 and 63 also remain undisturbed. Accordingly, the flux states represented in FIG. 3B for the latter branch legs are the same as that symbolized in FIG. 3A. Again an inspection of FIG. 2 with reference to the flux states shown in FIG. 3B shows that either one or both of the low resistance coupling loops 66 and 67 is coupled to a switchable branch leg 60 or 62 of three of the flux switching legs. It is also clear that neither of the switchable branch legs 60 and 62 of the flux switching leg 52 is coupled in either one of the coupling loops 66 and 67. The coupling of the low resistance loops 66 and 67 to the switchable branch legs in this illustrative operation is symbolized in FIG. 3B also by windings on the arrows.

During the drive phase $\Phi_2$ the drive flux induced in the drive leg 57 in a clockwise direction will as a result be directed to the flux switching leg 52, through the switchable branch legs 60 and 62 of which it finds a closure path. In this illustrative operation the scale has thus been tipped in favor of flux leg 52 by the inhibiting currents in the coupling loops 66 and 67. As a result of the flux changes in the flux leg 52 thus described, an output signal $y_2$ is induced in the output winding 72. This signal is then indicative of the fact that the input variables were $x_1=1$, $x_2=0$. In a subsequent reset phase $\Phi_3$ following the illustrative operations described in the foregoing, the reset current pulse 80 applied to the reset circuit 68, restores the balanced structure 50 and the cores 64 and 65 to the normal flux states as illustrated for the structure 50 in FIG. 3A.

The flux switching legs through which the drive flux closes during a drive phase for each of the possible combinations of input variables is given in the following table:

| Variable | | Flux leg switched |
|---|---|---|
| $x_1$ | $x_2$ | |
| 0 | 0 | 54 |
| 0 | 1 | 53 |
| 1 | 0 | 52 |
| 1 | 1 | 51 |

Figure 3A:
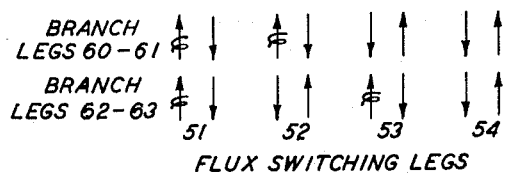
FIGS. 3A and 3B depict the various flux states of the legs of the illustrative translation circuit of FIG. 2 during particular operations.
Figure 3B:
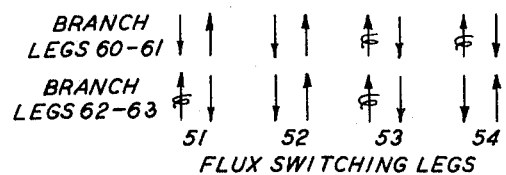

The remaining operations accomplishing the translation of the binary variables $x_1=0$, $x_2=1$, and $x_1=1$, $x_2=1$, are readily apparent from an inspection of the flux state symbols of FIGS. 3A and 3B with reference to the above table.

From the description of the foregoing embodiments according to the principles of this invention, it is clear that the novel balanced structure when interconnected with the low resistance coupling loops also described, may be employed in other and different contexts without departing from the scope of this invention. Thus although only simple translation circuits were specifically described, this invention may be adapted to accomplish virtually any logic function now performed by structures and circuits of other geometries and configurations. The control cores, which were shown as conventional toroids in the above illustrative embodiments, may advantageously comprise other multileg magnetic structures in which flux changes unilaterally control corresponding flux changes in the balanced magnetic structure. Variations and modifications in the balanced structure and low resistance coupling loop may also be made by one skilled in the art without departing from the spirit and scope of this invention.

In describing the illustrative embodiments of this invention particular polarities of energizing pulses and senses of the coupled windings were assumed. Clearly these were chosen for purposes of descriptional simplicity only. Thus, the coupling of the coupling loops to the branch legs of the balanced magnetic structures will be determined by the particular branch legs to be switched in view of the coding employed. Similarly the polarities of the energizing current pulses will be determined by the dictates of the particular system contexts in which the circuits of this invention are adapted. In addition to the above circuit details which may be suited to particular applications, the number of turns of the various windings shown in the drawing are illustrative only and none of these details shown are to be understood as limiting the scope of this invention.

In the description of the flux reorientations in the magnetic structures of the illustrative embodiments, particular flux closures and switchings were symbolized by dashed lines representing flux values with respect to the flux limitations of the legs in which these flux changes occurred. Although these symbols are entirely consistent for purposes of description, it is to be understood that the actual internal physics of the magnetic structures during energization is considerably more complex. Accordingly, the symbols employed are not to be understood as limiting this invention or otherwise constituting the only manner of explaining the magnetic phenomena involved.

What is claimed is:

1. A magnetic control circuit comprising a first magnetic structure of a material having substantially rectangular hysteresis characteristics, said first structure being formed to present a common drive leg and a first and a second parallelly connected flux switching leg, said first and said second flux switching legs each having an aperture therein dividing the leg into a first and a second branch leg, each of the branch legs of each of said flux switching legs having the same magnetic reluctance, a second magnetic structure also of a material having substantially rectangular hysteresis characteristics and formed to present a third flux switching leg therein, means for causing a flux switching in said third flux switching leg, an electrical coupling loop having only an arbitrarily low resistance therein coupling corresponding branch legs of said first and second flux switching legs in opposite senses to said third flux switching leg for inducing remanent magnetizations in opposite directions around said apertures in the branch legs of said first and second flux switching legs responsive to said flux switching, means for inducing a drive flux in said common drive leg, and output windings coupled to said first and said second flux switching legs energized responsive to flux switching in said last-mentioned legs.

2. A magnetic control circuit comprising a first magnetic structure having a first and a second flux leg therein, said flux legs being parallelly connected in said first structure and presenting flux paths of equal reluctance, said flux legs being of a material having substantially rectangular hysteresis characteristics and each having an aperture therein dividing the flux leg into a first and a second branch leg, input means for inducing remanent fluxes in the branch legs of said first and second flux legs in opposite directions around said apertures, drive means for applying a magnetomotive force across said first and second flux legs to induce a switching flux in each of said last-mentioned legs, an electrical coupling loop having only its inherent resistance therein wound on corresponding branch legs of said first and second flux legs in opposite senses energized responsive to flux switching in one of said corresponding branch legs for generating a countermagnetomotive force at the flux leg of said last-mentioned branch leg, and an output winding coupled to the other flux leg.

3. A magnetic control circuit according to claim 2 in which said input means comprises a second magnetic structure having a third flux leg also coupled in said electrical coupling loop and means for switching flux in said third flux leg to generate a current in said coupling loop.

4. A magnetic control circuit according to claim 3 in which the minimum cross-sectional area of said third flux leg is equal to the sum of the minimum cross-sectional areas of said corresponding branch legs.

5. A magnetic control circuit according to claim 4 in which said drive means comprises a common drive leg in said first magnetic structure connected to both ends of each of said first and second flux legs, and a drive winding coupled to said drive leg.

6. A magnetic control circuit comprising a first magnetic structure formed to present a common drive leg having parallelly connected at each end a first and a second flux switching leg, each of said last-mentioned legs having an aperture therein dividing the flux switching leg into a first and a second branch leg, said branch legs having substantially rectangular hysteresis characteristics, the legs of said structure being so dimensioned that all of the flux paths defined thereby are the same length, a second magnetic structure having a third flux leg therein also having substantially rectangular hysteresis characteristics, means including an input winding on said third flux leg for causing a flux change in said second structure, means for causing an equal flux change in said first structure comprising an electrical coupling loop having only an arbitrarily low resistance therein coupled to said third flux leg and to the first branch legs of said first and second flux leg, said last-mentioned coupling being in senses such that one of said first branch legs is magnetized in one direction and the other of said first branch legs is magnetized in the opposite direction, means for applying an equal magnetomotive force to each of said first and second flux switching legs in said one direction, means for preventing a flux switching in said other of said branch legs comprising said electrical coupling loop, and an output winding on each of said first and second flux switching legs.

7. A magnetic control circuit comprising a first magnetic structure having a hysteresis curve having a sharply defined knee therein, said first structure being formed to present a first and a second flux switching leg parallelly connected between the ends of a common drive leg, means including an input winding on said drive leg for inducing a drive flux in said drive leg, and means for selectively steering said drive flux through one of said flux switching legs comprising a first and a second branch leg in each of said flux switching legs, said first branch leg of said one flux switching leg being previously magnetized in the direction of said drive flux and said first branch leg of the other flux switching leg being previously magnetized in the opposite direction from said drive flux, and an electrical coupling loop coupled to said first branch legs, said coupling being in a sense with respect to said first branch leg of said other flux switching leg such that an inhibiting current induced therein responsive to said drive flux generates a countermagnetomotive force.

8. A magnetic control circuit according to claim 7 in which each of said first and second flux switching legs presents the same magnetic reluctance and in which said electrical coupling loop has only a minimum resistance therein of a magnitude such that said countermagnetmotive force prevents a flux excursion beyond said knee of said hysteresis curve of said first branch leg of said other flux swtiching leg.

9. A magnetic control circuit according to claim 8 also comprising means for previously magnetizing said first branch legs of said first and second flux legs comprising a second magnetic structure having a hysteresis curve having a sharply defined knee therein, said second structure being formed to present a third flux switching leg, said last-mentioned leg also being coupled to said electrical coupling loop and being dimensioned such that said inhibiting current is insufficient to cause a flux excursion in said third flux leg beyond said knee of said hysteresis curve of said second magnetic structure, and means including an input winding on said third flux leg for causing a complete flux switching in said last-mentioned flux leg.

10. A magnetic control circuit according to claim 9 also comprising an output winding on said other flux switching leg.

11. A magnetic control circuit according to claim 10 in which the minimum cross-sectional area of each of said drive and flux switching legs is at least equal to the the sum of the minimum cross-sectional areas of the branch legs of a flux switching leg and the minimum cross-sectional area of said third flux switching leg is at least equal to the sum of the minimum cross-sectional areas of said first branch legs.

12. A magnetic control circuit according to claim 11 also comprising a reset circuit having windings therein coupled to said first branch legs of said first and second flux switching legs and to said third flux switching leg.

13. A magnetic translation circuit comprising a magnetic coding structure having substantially rectangular hysteresis characteristics, said coding structure being formed to present a plurality of flux switching legs parallelly connected between the ends of a common drive leg, said flux switching legs having the same magnetic reluctance and each having a pair of apertures therein dividing each of said flux switching legs into a first and a second pair of branch legs, said coding structure being dimensioned such that the flux paths defined by said drive leg and said plurality of flux switching legs are equal in length, a first and a second input magnetic core also having substantially rectangular hysteresis characteristics, an input winding on each of said first and second input cores selectively energizable in accordance with input information for switching said last-mentioned cores, a first and a second electrical coupling loop interconnecting respectively said first and second input cores and corresponding branch legs of said first and second pairs of branch legs, said coupling loops being wound on said branch legs in predetermined senses in accordance with a particular code, said first and second coupling loops being energized responsive to flux switching in said first and second input cores to induce remanent fluxes in one direction in particular corresponding branch legs of said first and second pairs of branch legs, means including a drive winding on said drive leg for applying a drive magnetomotive force in a direction opposite to said one direction equally to said plurality of flux switching legs, each of said first and second coupling loops having only a resistance therein of a magnitude such that an inhibiting current is generated therein responsive to said applied drive magnetomotive force to produce a countermagnetomotive force of a magnitude sufficient to prevent flux excursions in said particular corresponding branch legs beyond their switching thresholds, and an output winding coupled to each of said plurality of flux switching legs energized responsive to closure of flux through said flux switching legs in accordance with said particular code.

14. A magnetic translation circuit according to claim 13 in which the minimum cross-sectional areas of said first and second input cores are at least equal respectively to the sum of the mimimum cross-sectional areas of corresponding branch legs of said first and second pairs of branch legs.

15. A magnetic translation circuit according to claim 14 also comprising a reset circuit including a reset winding on each of said first and second input cores and on one of the branch legs of each of said first and second pairs of branch legs.

16. A magnetic control circuit comprising a multileg first magnetic structure having substantially rectangular hysteresis characteristics and having a drive flux leg and a pair of selection flux legs connected at the ends to the ends of said drive flux leg, each of said selection flux legs having an aperture therein dividing the leg into a first and a second branch leg, said legs being arranged such that the closed flux paths including said drive leg and said branch legs are equal in length, each of said branch legs being flux limited to substantially the same flux magnitude, said drive leg and said selection legs each being flux limited to a flux magnitude substantially twice the flux limitation of any one of said branch legs, means for inducing opposite magnetizations around said apertures, means including a drive winding for inducing a drive flux in said drive leg, means for selectively controlling the closure of said drive flux through said selection legs comprising an electrical coupling loop having only an arbitrarily low resistance therein inductively coupled in opposite senses to corresponding ones of said branch legs, and output windings coupled respectively to said selection legs.

17. A magnetic control circuit according to claim 16 also comprising means for switching the magnetizations around said apertures comprising a second magnetic structure having substantially rectangular hysteresis characteristics and having a control flux leg therein coupled to said coupling loop, said control flux leg being flux limited to a flux magnitude substantially equal to the sum of the flux limitations of said corresponding ones of said branch legs and means including an input winding for causing a flux switching in said control flux leg.

18. A magnetic control circuit according to claim 17 in which each of said selection legs presents an equal magnetic reluctance to said drive flux.

No references cited.